(12) United States Patent
Meynieux

(10) Patent No.: US 7,150,349 B2
(45) Date of Patent: Dec. 19, 2006

(54) MECHANICAL DEVICE COMBINED WITH AIRFLOW FOR UNTANGLING SPRINGS

(75) Inventor: Jean Meynieux, Limoges (FR)

(73) Assignee: Societe Technique d'Automatisme et d'Ensembles a Ressorts dite Staer, Limoges (FR)

( * ) Notice: Subject to any disclaimer, the term of this patent is extended or adjusted under 35 U.S.C. 154(b) by 336 days.

(21) Appl. No.: 10/390,040

(22) Filed: Mar. 18, 2003

(65) Prior Publication Data

US 2004/0069595 A1    Apr. 15, 2004

(30) Foreign Application Priority Data

Mar. 18, 2002  (FR)  .................. 02 03327

(51) Int. Cl.
*B65G 47/12*  (2006.01)
*B65G 47/14*  (2006.01)
*B65G 27/00*  (2006.01)

(52) U.S. Cl. ............... 198/533; 198/532; 198/550.01; 198/550.3; 198/443; 198/446; 198/493; 198/396

(58) Field of Classification Search .............. 198/532, 198/533, 550.01, 550.3, 443, 446, 493, 396
See application file for complete search history.

(56) References Cited

U.S. PATENT DOCUMENTS 1,483,601 A    2/1924  Thorsell
2,760,679 A *  8/1956  Chadderton et al. ........ 221/225
2,819,465 A    1/1958  McIlvin
2,828,888 A *  4/1958  Charles .................... 221/263
3,086,639 A *  4/1963  Donofrio et al. ........... 198/396
3,307,723 A *  3/1967  Walker et al. .............. 414/414
3,542,185 A * 11/1970  Geyer et al. ................ 406/47
3,637,065 A *  1/1972  Ruscitti .................... 198/396
4,057,137 A * 11/1977  Hansen et al. ............. 198/443
4,462,508 A *  7/1984  Grafius ..................... 221/201
4,498,574 A *  2/1985  Fischer ..................... 198/380
4,739,873 A *  4/1988  Yajima ..................... 198/391
4,795,019 A *  1/1989  Spada et al. ............. 198/347.2
5,713,454 A *  2/1998  Jordan .................... 198/391
5,775,478 A *  7/1998  Shinjo ..................... 198/389
5,826,698 A * 10/1998  Sawada ................... 198/443
5,836,437 A * 11/1998  Saito et al. ............... 198/396
5,934,505 A *  8/1999  Shimada .................. 221/236
6,513,644 B1 * 2/2003  Takahashi et al. ......... 198/396

FOREIGN PATENT DOCUMENTS

DE    33 21 173 A1   12/1984
DE    35 03 102 A    8/1985

* cited by examiner

*Primary Examiner*—Gene O. Crawford
*Assistant Examiner*—Leslie A. Nicholson, III
(74) *Attorney, Agent, or Firm*—Young & Thompson

(57) ABSTRACT

The object of the invention is a means for untangling springs (60) contained in a supply bin (12), characterized in that it comprises untangling means (14) with a rail (30) for receiving springs, provided with an open groove (36), means (32) for dynamically calibrating the springs, means for supplying said rail with springs and evacuation means (18).

12 Claims, 2 Drawing Sheets

MECHANICAL DEVICE COMBINED WITH AIRFLOW FOR UNTANGLING SPRINGS

BACKGROUND OF THE INVENTION

The present invention relates to a device for untangling springs, which comprises mechanical untangling means, combined with an airflow.

Springs having dimensions of 5 to 40 mm in length and 2 to 15 mm for example can be easily picked up by hand or with tools but these springs always become entangled when they are assembled in bulk. Mechanical systems comprising for example vibrating bowls do not necessarily give satisfaction to ensure untangling and distribution.

However, there exists a need for sorting springs one by one to permit the distribution either directly to workstations for emplacement on products for which they are adapted, or for delivery to packaging stations for their ultimate use.

Generally speaking, in the first instance, it is necessary no matter what the destination to sort and separate the springs to let them circulate in an evacuation tube.

This is the object of the present invention.

Moreover, given the low cost of the products and the low added value, the device should remain simple and have high reliability.

On the other hand, it is necessary to have a device which ensures total discrimination, which avoids any risk of distributing two intimately connected springs, which has a high rate of separation and sorting.

It is also known that in certain lots of springs, there exist at the end of sorting tangles of inextricable springs, caused by the sorting means themselves, particularly those using vibrations. These tangles are thus unusable and constitute a loss. These should be avoided.

SUMMARY OF THE INVENTION

In the device of the present invention, it is possible at any time to be assured of good operation and in case of breakdown, the return to service is extremely simple and rapid. Similarly, the loading takes place without particular precautions, by filling in bulk a supply bin, by a hopper if desired, to permit continuous operation.

Thus, continuous operation is often a requirement in environments requiring emplacement of springs such as automobiles, household appliances or electronics, to cite but a few.

BRIEF DESCRIPTION OF THE DRAWINGS

The device according to the present invention will now be described with respect to a preferred embodiment whose indicated characteristics are in no way limiting.

This description is given with respect to the accompanying drawings, in which.

DETAILED DESCRIPTION OF THE PREFERRED EMBODIMENTS

Figure 1:
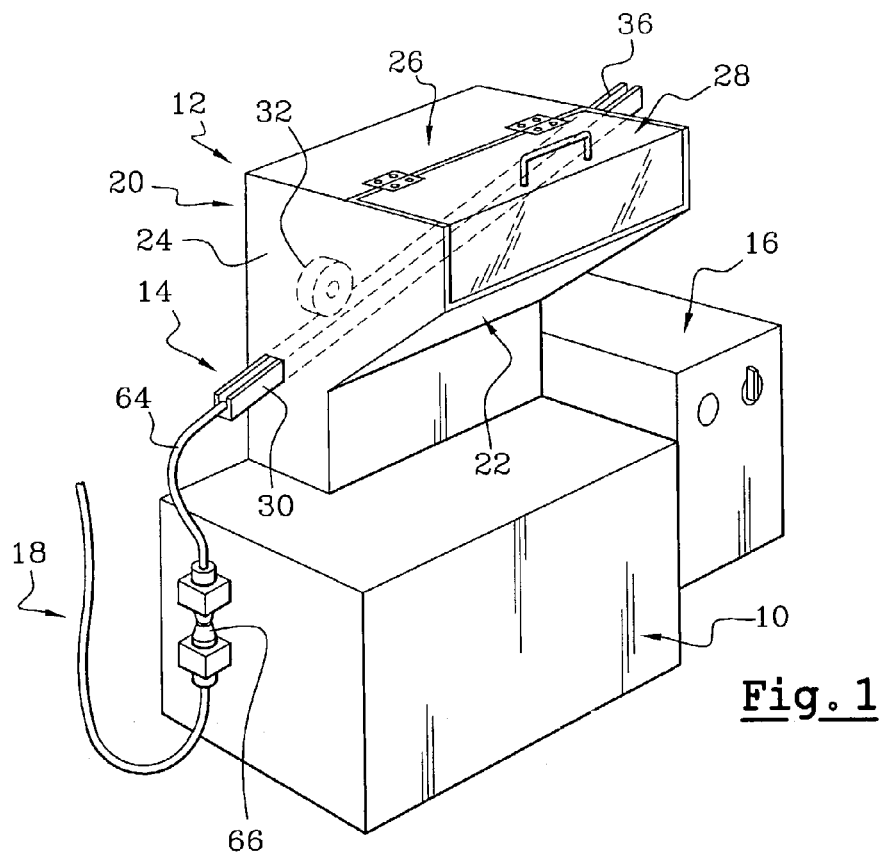
FIG. 1 is an external perspective view of the complete device.

In FIG. 1, there is shown a housing 10 supporting a supply bin 12 provided with untangling means 14, a control station 16 and evacuation means 18.

The housing comprises motor means and the supply or production of compressed air if the assembly is autonomous. These elements are well known and are not shown, to focus the drawings on the object of the invention.

The supply bin comprises a rear vertical wall 20, a bottom 22 inclined toward the rear wall and three lateral complementary surfaces 24 as well as a cover 26, closing the bin and permitting refilling. The cover 26 is provided with a lid 28 which permits access to the interior of the bin. It is also possible to install a hopper or trough on this cover to facilitate reloading the springs, without having to open the lid.

The untangling means 14 comprise a rail 30, dynamic calibrating means 32 and means 34 for supplying springs to said rail.

The rail is connected to the rear wall 20, with an inclination at an angle α relative to the horizontal.

This rail comprises a longitudinal groove 36, that is open and centered and provided on the upper surface 38 of the rail 30.

This groove 36 has a square cross section, the size of the side being equal to the diameter of the spring, with fairly precise tolerance.

The dynamic calibrating means 32 comprise a wheel 37, substantially of the width of the upper surface 38 of the rail. This wheel is provided with notches 40 and its axis of rotation is perpendicular to the rear surface 20.

Thus, one of the flanges 44-1 of the wheel is located parallel to and immediately adjacent to rear surface 20.

The direction of rotation is indicated by the arrow 46. It is oriented such as to cause the notches to turn from downstream to upstream of the rail.

The wheel is positioned such that the notches pass above the rail, leaving only a clearance less than the diameter of the wire from which the springs have been made.

The spring supply means 34 of the untangling means comprise an elevator 48. This elevator is constituted by a plate 50, vertical and parallel to the rear surface 20. This plate is also parallel to the free vertical surface of the rail and of the other flange 44-2 of the wheel 37.

This plate is dynamic and is subject to alternate vertical movement in the direction of the double arrow 51, caused for example by means of an articulated connecting rod.

The plate passes through an opening provided in the bottom 22 of the supply bin during its movements.

Figure 3A:
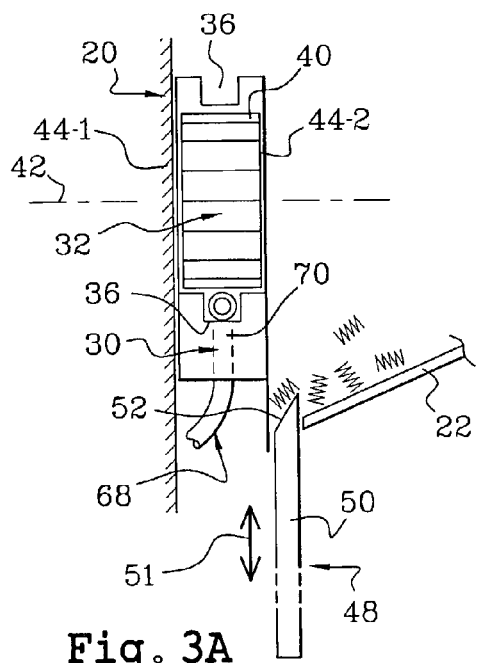
FIGS. 3A and 3B are views of the operation of the supply means.
Figure 3B:
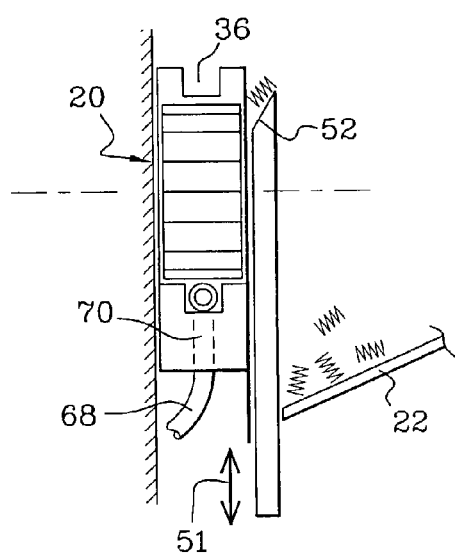
Figure 2:
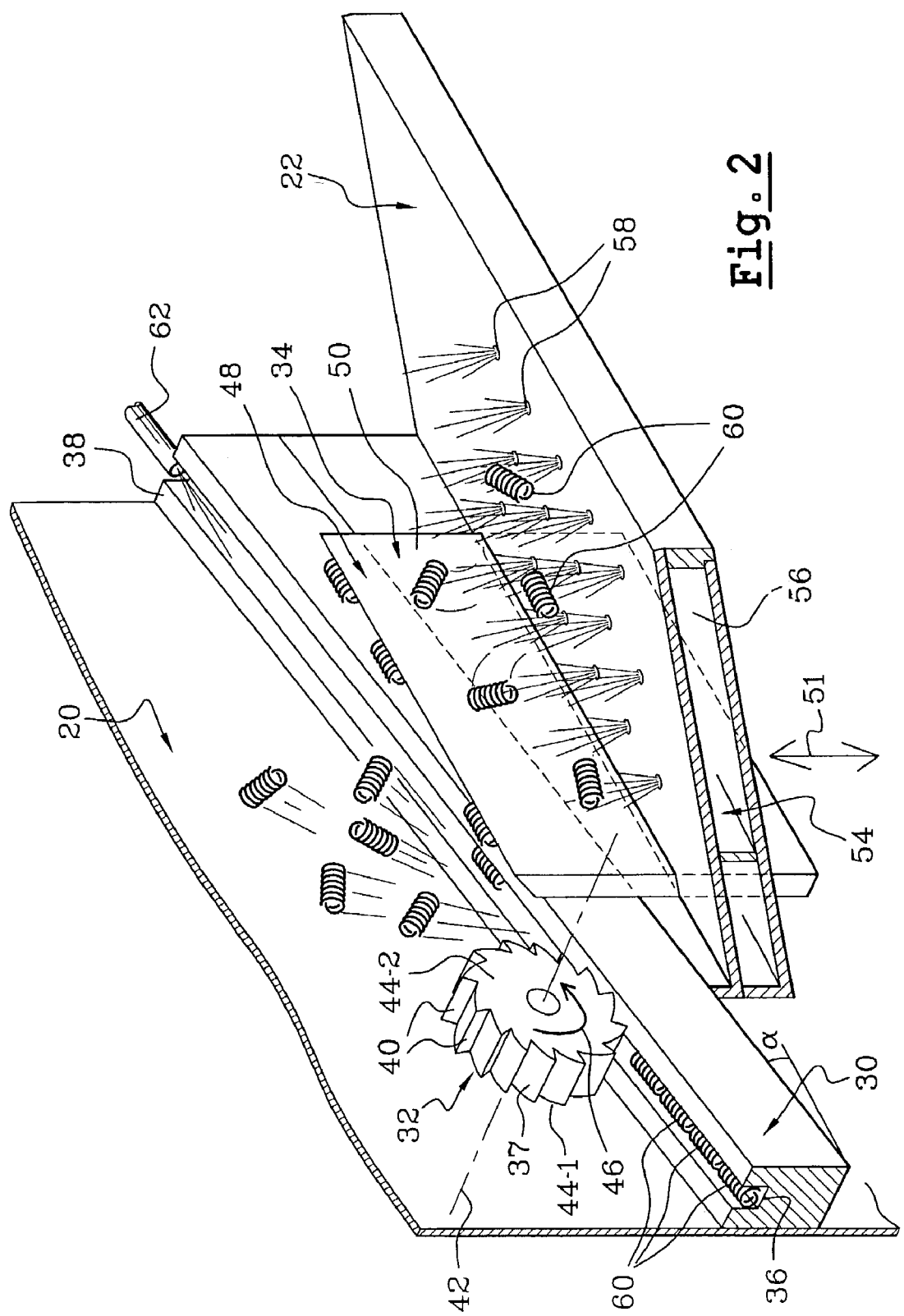
FIG. 2 is a perspective view of the untangling means.

In FIGS. 3A and 3B, these movements of the plate will be better understood.

Thus, the upper edge 52 of the plate is flush with the internal surface of the bottom 22 in the lower position and rises above the rail in the upper position, over all its length.

It is to be noted that the section of the edge 52 of this plate is beveled, inclined toward the rail.

The spring supply means 34 are preferably completed by means 54 for agitation of the springs with air within the supply bin 12.

These agitation means comprise a distribution chamber 56 for air under pressure and outlets 58 opening through the internal surface of the bottom 22.

The chamber could be replaced by individual flexible conduits for supplying each outlet, without in any way modifying the invention.

The jets of air under pressure emitted by the outlets are located below the springs 60 disposed in bulk in said bin.

The evacuation means 18 comprise a nozzle 62 for emission of air under pressure, positioned upstream of the groove 36 of the rail 30 and directed into the groove from upstream toward downstream.

These evacuation means are completed by a tube 64 with a connection 66 for propulsion by compressed air of the springs 60 introduced into the tube 64.

The operation of such a device will now be given with respect to the different figures, considered in any order.

Springs 60 are disposed in bulk in the supply bin 12.

Air under pressure is distributed through the outlets 58, giving rise to agitation of the springs with formation of a fluidized bed of springs.

The plate 50 is moved alternately in the vertical direction.

The springs are thus placed in movement and certain of them are conducted by the combined action of the airflow from the outlets and by the slope of the bottom 22 toward the section of the edge 52 of the plate. These springs are thus raised by the plate with its elevating effect. As the edge is inclined, the entrained springs are moved along the rail 30 on the upper surface 38.

Because this rail is inclined, the springs slide, rolling on this surface 38.

When an isolated spring is located perfectly aligned with the groove 36, it moves into the interior.

Then it is subjected to the airflow emitted by the nozzle 62 of the evacuation means 18.

The spring is pushed in the groove.

In parallel, the dynamic calibrating means 32 are used. The wheel 37 is rotated.

Because of this, the springs 60 which are located correctly positioned in the groove 36 of the rail 30 pass below the notches of the wheel 37 and are propelled into the tube 64 by the combined effect of the airflow from the nozzle 62 and the slope α of the rail.

The other springs discharged by the plate 50 during its ascent and which are located on the surface 38 of the rail roll and slide up to the wheel. The latter, because of its speed of rotation and its notches, strikes and projects the springs in different directions, within the supply bin. These springs are taken up into the fluidized bed and untangled if they were still tangled, only by the effects of shock and by the speed of propulsion.

During this time, the plate is going through its cycle and opens the space so that further springs can be reloaded.

Thus, the springs are continuously moving and statistically, for each cycle, there will be certain ones correctly positioned in the groove of the rail.

If two springs are nevertheless interlaced by their coils, this double spring falls into the groove and is pressed toward the wheel, the extra thickness is such that the double spring is discharged from the groove by the notches and propelled into the free space, against the walls, giving rise to untangling of this double spring into two springs for future return to the rail.

It will be seen that at the end of loading or of operation, the last spring will always be brought toward the plate and distributed on the rail by the plate, thanks to the inclined bottom 22 and to the movement of the air streams. There are thus used all of the springs disposed in the supply bin 12.

Any formation of a tangle is avoided by continuous movement of the springs.

Such a device is of high reliability because the pieces which constitute it are not numerous, are simple and the kinematics do not require any complicated movement which might be a source of problems.

The cycles of emission, adjustment of the power of these flows, the speeds of rotation of the wheel or any other parameter is adjustable from the control station 16, this with the help of valves and of any other known means requiring no particular description.

So as to improve the device and to avoid any blockage, there can be provided ejection means 68. Such means comprise a nozzle 70 opening below the dynamic calibrating means 32, more exactly below the wheel, immediately upstream. A high power airflow can be sent periodically, for a very short period of time, so as to automatically propel any spring which might be caught in the wheel without being returned by the notches.

These automatic means improve the reliability and decrease the number of operations on the device to a minimum.

The invention claimed is:

1. A device for untangling springs contained in a supply bin, said device comprises:
   means for untangling springs, said means for untangling springs includes a rail for receiving springs, said rail having an open groove, a dynamic calibrating means for the springs, and means for supplying springs to said rail; and
   means for evacuating springs at an outlet of the groove.

2. Untangling means according to claim 1, wherein the groove is of square cross section with a side of a dimension equal to the diameter of each spring.

3. Device for untangling springs according to claim 1, wherein the dynamic calibrating means are disposed immediately above the open groove.

4. Untangling device according to claim 1, wherein the dynamic calibrating means comprise a wheel provided with notches and rotating from downstream toward upstream.

5. Untangling device according to claim 1, wherein the means for supplying springs to the rail comprise a plate vertically movable with an alternating movement, parallel to the rail, forming an elevator, an edge of said plate being inclined toward said rail.

6. Untangling device according to claim 5, wherein the means for supplying springs to the rail comprise an inclined bottom of the supply bin.

7. Untangling device according to claim 5, wherein the means for supplying springs to the rail comprise means for agitating the springs with air, disposed within the supply bin.

8. Untangling device according to claim 7, wherein the means for agitating the springs with air are comprised by a chamber for distribution of air under pressure and outlets opening through the internal surface of the bottom of the supply bin.

9. Untangling device according to claim 5, wherein the supply bin comprises a vertical rear surface, a bottom inclined toward this rear surface, the rail being fixed on this surface with an inclination α relative to the horizontal, the wheel being of the width of the upper surface of said rail, disposed immediately above this surface, its axis of rotation perpendicular to the rear surface, the plate being parallel to the rail, with translatory movements parallel to a flange of the wheel and to a free surface of the rail.

10. Untangling device according to claim 1, wherein the evacuation means comprise a nozzle for the emission of air under pressure, positioned upstream of the groove of the rail and directed into the groove from upstream to downstream and the ejection means comprising a nozzle opening below the dynamic calibrating means.

11. A device for untangling springs, comprising:
    a supply bin;
    a rail inclined with respect to a first wall of said supply bin, said rail having an open groove;
    a dynamic calibrating member rotatable above said open groove;

a plate movable from a first position to receive springs at a second wall of said supply bin to a second position to transfer said springs to said open groove, said first position being below said rail and below said second position; and a device for evacuating springs at an outlet of said open groove.

12. A device for untangling springs contained in a supply bin, said device comprises:

a rail for receiving springs, provided with an open groove;

a dynamic untangling member above said rail;

a plate vertically movable with an alternating movement, parallel to the rail, forming an elevator, an edge of said plate being inclined toward said rail;

a device for evacuating springs at an outlet of the groove; and an agitator for agitating the springs with air, disposed within the supply bin, said agitator includes a chamber for distribution of air under pressure and outlets opening through an internal surface of a bottom of said supply bin.

* * * * *